June 11, 1946.　　F. P. LAWLER　　2,401,875
REDUCTION GEAR DRIVE
Filed April 1, 1944　　3 Sheets-Sheet 1

INVENTOR.
FRANK P. LAWLER
BY Eastberg & Roemer
ATTORNEYS

June 11, 1946.   F. P. LAWLER   2,401,875
REDUCTION GEAR DRIVE
Filed April 1, 1944   3 Sheets-Sheet 2

INVENTOR.
FRANK P. LAWLER
BY
Eastberg & Roemer
ATTORNEYS

June 11, 1946.  F. P. LAWLER  2,401,875
REDUCTION GEAR DRIVE
Filed April 1, 1944  3 Sheets-Sheet 3

INVENTOR.
FRANK P. LAWLER
BY Castberg&Roemer
ATTORNEYS

Patented June 11, 1946

2,401,875

UNITED STATES PATENT OFFICE 2,401,875

REDUCTION GEAR DRIVE

Frank P. Lawler, Chicago, Ill.

Application April 1, 1944, Serial No. 529,138

2 Claims. (Cl. 74—305)

This invention relates to a reduction gear drive of the differential planetary type adapted to be used for a power transmitting connection between a relatively high speed prime mover and any machine required to be driven at a lower speed.

Objects of the invention are generally to improve and simplify the construction and operation of reduction gear drives of the character described; to provide a reduction gear drive capable of giving a very little or a very great change in relative angular velocity, with the same or opposite directional relationship, all within very small compass; to provide a reduction gear drive in which the operating components can be proportioned so that the angular velocity of the driving member will always be greater than the angular velocity of any of the other members employed in effecting or generating the reduction; to provide a reduction gear drive in which the high speed drive shaft and the low speed driven shaft are maintained in axial alignment; to provide a reduction gear drive in which the three main elements, the drive shaft, the driven shaft and the cooperating planetary gear carrier are mounted in or on independent sets of bearings which are independently reactively mounted on the enclosing housing, in order to give maximum rigidity of the operating parts; to provide a planet gear carrier which is straddle mounted in relationship to the reduction gearing, on two widely spaced bearings reactively supported by the housing; to provide a reduction gear drive housing consisting of two pieces, with mounting pads or feet integral with the part of the housing in which the slow-speed high-torque driven shaft is journaled; and further to provide a reduction gear drive of the differential type having high potential reduction ratio possibilities in which the gearing elements can be proportioned so that engagement of the differential elements and the resultant power loss due to tooth friction will be kept to the absolute minimum possible to attain in any differential gearing system.

The reduction gear drive is shown by way of illustration in the accompanying drawings in which—

Figure 1:
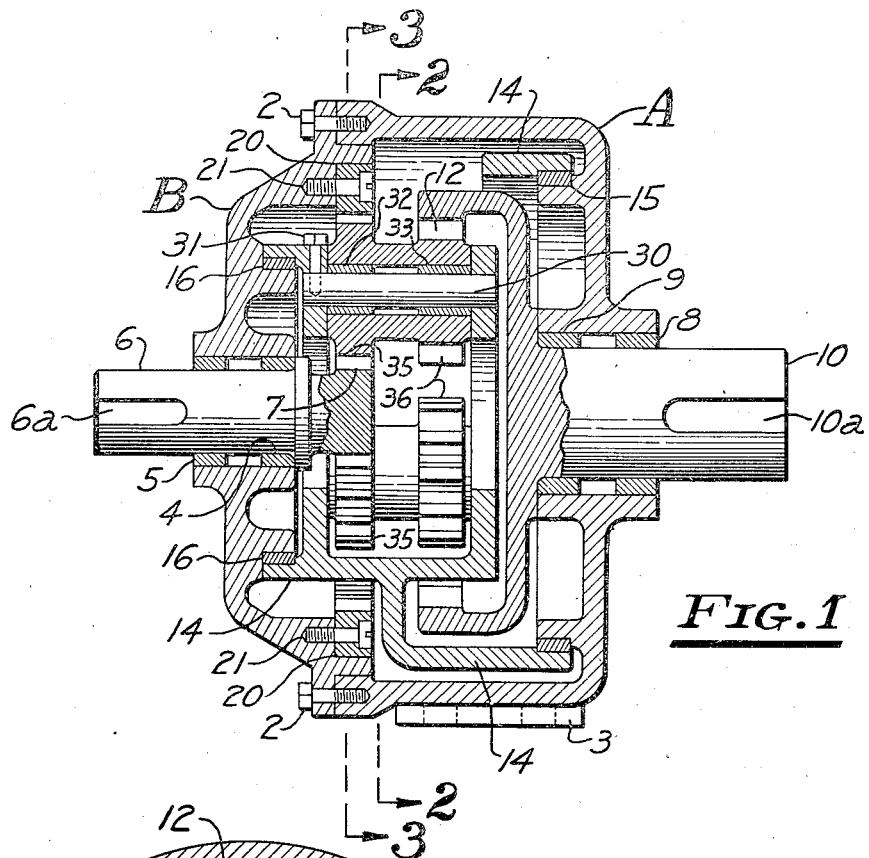
Figure 1 is a vertical longitudinal section of the reduction gear drive.
Figure 2:
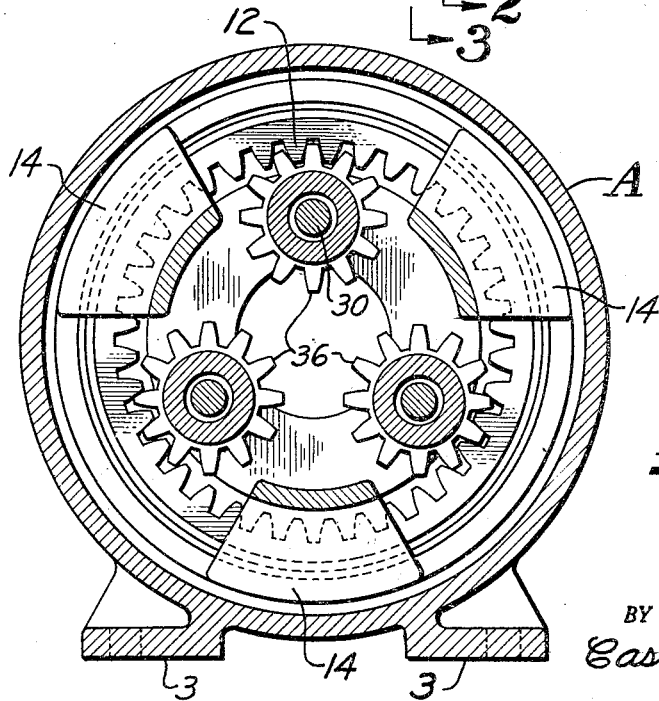
Figure 2 is a cross section taken on line 2—2 of Figure 1.
Figure 3:
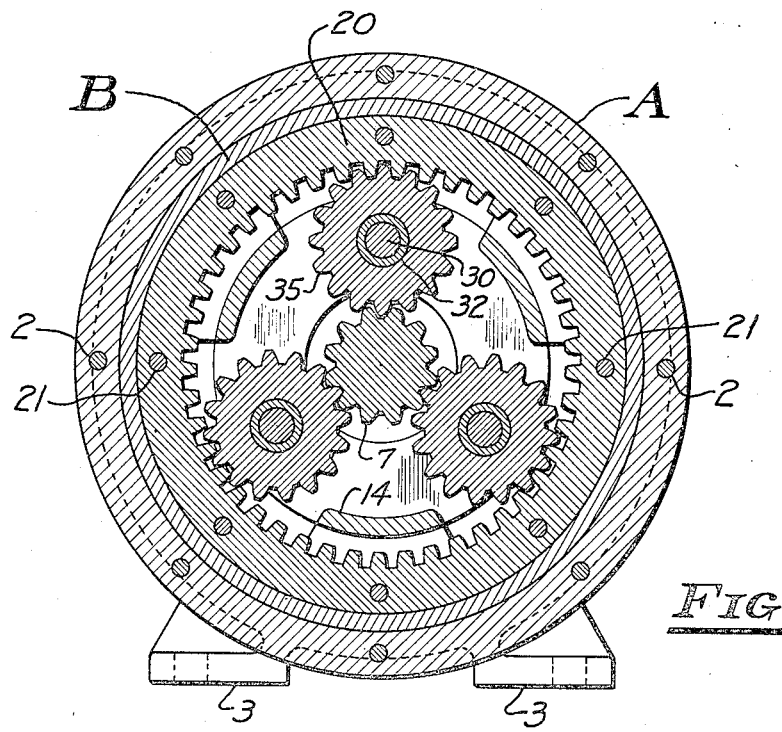
Figure 3 is a cross section taken on line 3—3 of Figure 1.

Referring to the drawings in detail and especially to Figure 1, A indicates a housing and B a housing cover, both of which are flanged and secured together by bolts 2 or other similar means. Housing A is provided with pedestals or bases 3 to permit it to be secured to a suitable frame or support.

Bearings 4 and 5 mounted in the housing cover B form journals for a drive shaft 6, which is provided with a suitable drive keyway 6a or the like. Integrally formed or secured on the inner end of the drive shaft 6 is a sun pinion 7.

Bearings 8 and 9 mounted in the housing A form journals for a driven shaft 10, which is provided with a suitable drive keyway 10a or the like. Integrally formed or secured on the inner end of the driven shaft 10 is a driven internal ring gear 12.

Figure 4:
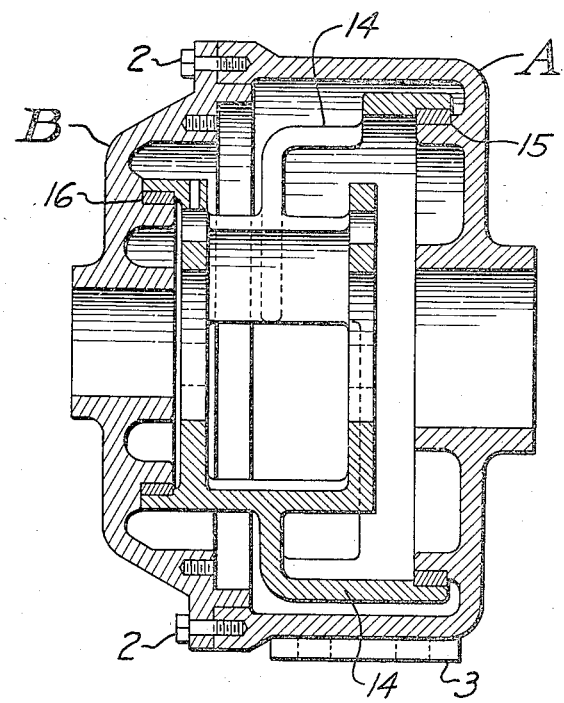
Figure 4 is a vertical longitudinal section similar to Figure 1 in which all parts have been removed with the exception of the housing, the planet gear carrier and its supporting bearings.

A planet gear carrier 14 is journaled in the housing A by means of bearing 15, and it is also journaled in the housing cover B by means of bearing 16. This is best shown in Figure 4 and this construction will be referred to later.

A stationary ring gear 20 is shown anchored to the housing cover B by means of bolts 21 or the like. Ring gear 20 thus becomes stationary in relationship to the housing A as well as to the housing cover B.

Supported in the planet gear carrier 14 are a plurality of planet gear axis pins 30, which are anchored in relationship to the planet gear carrier 14 by means of bolts 31 or some similar arrangement.

Journaled on each planet gear axis pin 30 by means of bearings 32 and 33 are a pair of connected planet gears 35 and 36. (These are termed planet gears since they rotate about their own axis which axis, in turn, rotates about the sun pinion axis.) Planet gears 35 are arranged to mesh with the sun pinion 7 and the stationary ring gear 20, while planet gears 36 are arranged to mesh with and drive the driven internal ring gear 12.

It will be apparent that the sun gear 7, the plurality of planet gears 35 and the stationary ring gear 20 together comprise the most simple form of a planetary gear train, the characteristics of which are well known. When the sun pinion 7 is driven in one direction, the planet gear carrier will always be driven in the same direction but at a reduced speed, and the planet gears 35 will always be driven around their axis pins 30 in the opposite direction.

To understand the ability of this reduction gear drive to generate a relative change in angular velocity between the drive shaft 6 and the driven shaft 10, as well as its ability to effect this velocity change in the same or opposite directional relationship between the two shafts, it will be necessary to frequently mention rotation in one direction and rotation in the opposite direction. For clarity it is deemed advisable to distinguish rotaton in one direction by the + sign and rotation in the opposite direction by the — sign.

Consider the drive shaft 6 and the sun pinion 7 as being driven in a + direction. The planet gear carrier 14 and the planet gear axis pins will then also be driven in a + direction, while the planet gears 35 and 36 will simultaneously be driven in a — direction about their axis pins 30.

The connected planet gears 35 and 36 are therefore influenced by two simultaneous motions acting in opposed directions; rotation in a + direction due to their axis pins 30 being rotated in a + direction, and simultaneously rotating in a — direction about their own axis pins 30.

The result of this compound motion which is thus impressed on planet gears 36 is transmitted directly to the driven internal ring gear 12, since the planet gears 36 and the ring gear 12 are in operating mesh.

Figure 5:
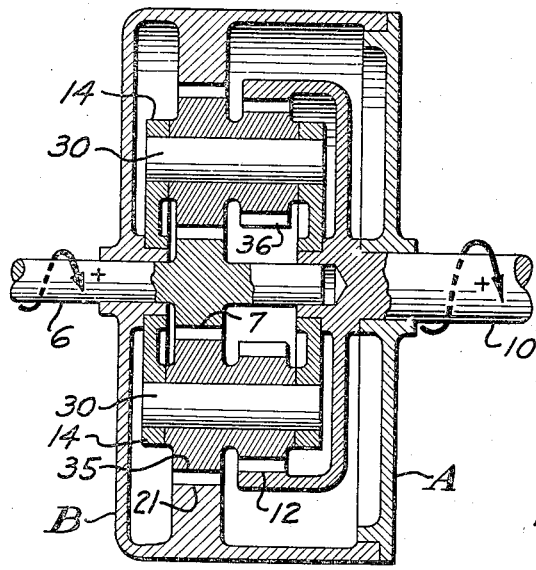
Figure 5 is a schematic longitudinal section of the reduction gear drive showing the gear proportions as required to effect rotation of the driven shaft in the same direction as the driving shaft.

If the + rotation of this compound motion is greater than the — rotation then the driven internal ring gear 12 and its integral shaft 10 will be driven in a + direction as shown in Fig. 5; which is to say that the drive shaft 6 and the driven shaft 10 will rotate in the same direction under this condition. The + rotation of the compound motion will always be greater than the — rotation so long as the pitch diameter of planet gear 35 is greater than the pitch diameter of planet gear 36, and this is the only requirement in the design for accomplishing a change of angular velocity between the drive shaft 6 and the driven shaft 10 in the same direction.

Figure 7:
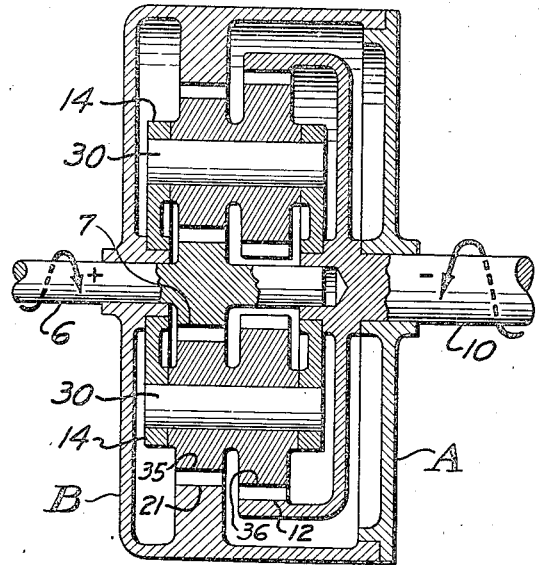
Figure 7 is a view similar to Figure 5 in which the relative gear proportions are shown changed to effect rotation of the driven shaft in opposite direction to the driving shaft.

On the other hand the — rotation of the compound motion will be greater than the + rotation whenever the pitch diameter of the planet gear 35 is less than the pitch diameter of the planet gear 36 as shown in Fig. 7, and this is the only requirement for accomplishing a change in angular velocity between the drive shaft 6 and the driven shaft 10 in opposite directions.

Figure 6:
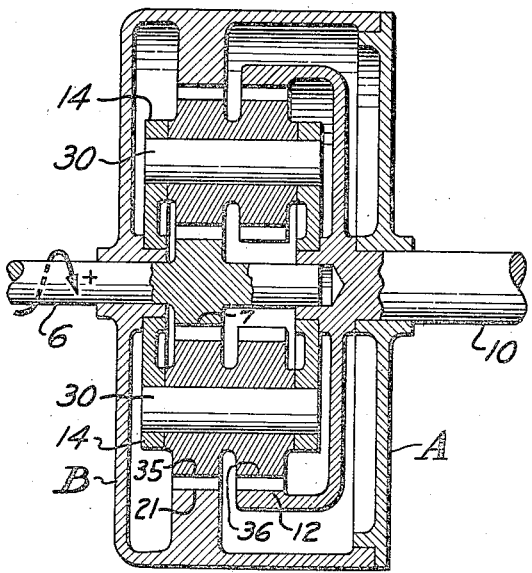
Figure 6 is a view similar to Figure 5 in which the relative gear proportions are shown changed to produce an infinite speed reduction.

When the + and — rotations imparted to the planet gears 36 are exactly equal, it is obvious that they then would cancel one another. This condition would obtain whenever the connected planet gears 35 and 36 have exactly the same pitch diameter as shown in Fig. 6. Under this condition the driven shaft 10 will remain stationary no matter how fast or in what direction the drive shaft 6 is rotated. This would result in an unlimited reduction, or an infinite reduction ratio.

From the above it will be apparent that the closer the pitch diameters of the connected planet gears 35 and 36 approach equality, the greater the ratio of reduction. Whether the reduced speed of the driven shaft 10 is effected in the same direction or the reverse direction to the rotation of the drive shaft 6 is determined entirely by which one of the connected planet gears 35 or 36 has the greatest pitch diameter.

It follows that by the simple process of minutely varying the relative pitch diameters of the connected planet gears 35 and 36 a very flexible reduction gear drive can be designed to give a wide variation of both high and low reduction ratios, accompanied by optional selection of the same or opposite directional relationship of the driving and driven shafts as desired.

One of the particular features of this reduction gear drive is the manner in which the cooperating gears are maintained in operating alignment. Figure 4 clearly shows how the planet gear carrier 14 is independently straddle mounted in the housing, one end being supported by bearing 15 in the housing A and the other end supported by bearing 16 in the housing cover B. As shown in Figure 1 the drive shaft 6 is rigidly supported in its own bearings 4 and 5 in the housing cover B, while the driven shaft 10 is rigidly supported in its own bearings 8 and 9 in the housing A. Similarly the connected planet gears 35 and 36 are rigidly straddle mounted on bearings 32 and 33 which rotate on the axis pins 30 which, in turn, are straddle mounted in the carrier 14. In this construction all unbalanced overhung loads are avoided and the cooperating gears are extremely rigidly held in operating relationship. Destructive deflections are thus reduced to the absolute minimum enabling the smallest size gear teeth to be employed for developing a reduction gear drive of any given ratio and horsepower rating.

For the purpose of simplicity plain sleeve type bearings or bushings have been shown in the drawings. It is obvious that ball, roller or other types of bearings could be substituted for these if it is so desired. Similarly, oil seals, oil filling and draining plugs have not been shown.

While the various features of my invention have been more or less specifically described and illustrated, I nevertheless wish it understood that changes may be resorted to within the scope of the appended claims, and that the materials and finish of the various parts employed may be such as the experience of the manufacturer or varying conditions of use may demand.

Having thus described my invention, what I claim and desire to secure by Letters Patent is:

1. In a planetary reduction gear drive of the character described, an elongated housing having bearings formed at opposite ends thereof, a drive shaft journaled in one of said bearings, a driven shaft journaled in the opposite bearing, a planetary gear carrier disposed within the housing, a plurality of pairs of connected planetary gears journaled in the carrier, a stationary ring gear secured in the housing and meshing with one of each pair of planetary gears, a ring gear secured to the driven shaft to rotate the same, said ring gear meshing the other gear of each pair of planetary gears, a driving pinion on the drive shaft meshing the planetary gears which mesh the stationary ring gear, and stationary bearings within the housing on which the planetary gear carrier is journalled independently of the drive and driven shafts, said stationary bearings being disposed on opposite sides of all of the gears and at the respective ends of the housing.

2. In a planetary reduction gear drive of the character described, an elongated housing having bearings formed at opposite ends thereof, a drive shaft journaled in one of said bearings, a driven shaft journaled in the opposite bearing, a planetary gear carrier disposed within the housing, a plurality of journal pins secured in the carrier, a pair of connected planetary gears journaled on each pin, a stationary internal ring gear secured in the housing adjacent the end in which the drive shaft is journaled, said internal ring gear meshing one gear of each pair of planetary gears, a rotatable internal ring gear disposed in the opposite end of the housing and secured to the driven shaft to drive the same, said last named internal ring gear meshing the other gear of each pair of planetary gears, a driving pinion on the drive shaft and meshing the planetary gears which mesh the stationary ring gear, and stationary bearings within the housing on which the planetary gear carrier is journalled independently of the drive and driven shafts, said stationary bearings being disposed on opposite sides of all of the gears and at the respective ends of the housing.

FRANK P. LAWLER.